United States Patent
Gaysert et al.

[11] Patent Number: 5,253,806
[45] Date of Patent: Oct. 19, 1993

[54] LIQUID FUEL-OPERATED HEATER FOR VEHICLES

[75] Inventors: Gerhard Gaysert, Esslingen; Dieter Götz, Kirchheim, both of Fed. Rep. of Germany

[73] Assignee: J. Eberspächer, Esslingen, Fed. Rep. of Germany

[21] Appl. No.: 986,985

[22] Filed: Dec. 8, 1992

[30] Foreign Application Priority Data
Dec. 14, 1991 [DE] Fed. Rep. of Germany ....... 4141367

[51] Int. Cl.⁵ ............................................ F23D 15/02
[52] U.S. Cl. .................. 237/12.3 C; 431/37; 431/352; 126/110 C
[58] Field of Search ................. 431/350, 351, 352, 62, 431/37; 237/12.3 C; 126/110 C, 110 D

[56] References Cited
U.S. PATENT DOCUMENTS
4,744,747 5/1988 Kawamura et al. ........... 237/12.3 C Primary Examiner—Henry A. Bennet
Attorney, Agent, or Firm—McGlew and Tuttle

[57] ABSTRACT

A heater (independent vehicle heater) which can be operated in a particularly wide range between full load and partial load, e.g., 1:10 to 1:15, is shown. This is achieved by the annular space surrounding the combustion chamber being divided into two partial compartments and by supplying the combustion air to these partial compartments. A control element (back-pressure-controlled control element), which separates some of the air passage openings between the annular space and the combustion chamber from the passage of air, is arranged in the combustion air line.

4 Claims, 4 Drawing Sheets

LIQUID FUEL-OPERATED HEATER FOR VEHICLES

FIELD OF THE INVENTION

The present invention pertains to an arrangement in a liquid fuel-operated heater for vehicles, which heater is operated independently of the engine of the vehicle, with a combustion chamber, whose wall has air passage openings with a downstream flame tube, a heat exchanger and means for supplying fuel and for supplying combustion air, and an igniting device, as well as means for removing the heating air and for discharging flue gas, as well as an annular space surrounding the combustion chamber.

BACKGROUND OF THE INVENTION

Such heaters have been known as auxiliary heaters for heating passenger compartments of vehicles, boats or construction equipment while the engine of the vehicle is not in operation, and have been commercially available for many years. These prior-art heaters are designed for a defined rated capacity, so that sufficient heating with the vehicle engine not running or additional heating with the engine running and consequently supplying heat is possible even under extreme conditions. If only a small amount of heat is to be supplied, this is achieved in the prior-art heaters either by intermittent operation or by operation at partial load, usually at ¼ load at the lowest level.

It has been known that the burners of such heaters are operated, regardless of the mode of fuel supply and the mixture preparation, with an air ratio of lambda $\lambda = 1.2$–$1.5$ at full load. To operate the burner in the partial load range, the amount of fuel must be reduced corresponding to the changed output ratio (partial load:full load). To achieve satisfactorily clean combustion, the amount of combustion air must be adjusted as well. Investigations carried out in this connection have shown that air ratios of lambda $\lambda = 2$ lead to the relatively best combustion values at the ¼ partial load that is commonly used currently. However, this depends essentially on the design of the burner. Thus, air ratios in the range of lambda $\lambda = 3$–$4$ are obtained for some prior-art combustion chambers. These high air ratios are necessary in order to achieve still satisfactorily clean combustion with still tolerable emission values in the partial load range. The necessary reduction of the amount of combustion air is brought about in the prior-art heaters corresponding to the partial load-to-full load ratio by reducing the fan speed, which does not, of course, take place in direct proportion to the reduction of the fuel supply for the reasons shown.

However, the requirement to operate a heater with a high air ratio in the partial load range has the disadvantage that the excessive supply of combustion air leads to cooling of the flame and it consequently adversely affects burn-out. Another disadvantage is that the heater cannot be operated at partial loads lower than ca. ¼, even though this is no longer sufficient for satisfying the increased demands on comfort. Ranges of 1:10 to 1:15 are now desirable especially in utility vehicles. For example, preheating the engine of a truck requires a heating output of 10 kW, whereas 1 kW is sufficient for heating the sleeping box.

An ultrasonic atomization burner of this class for air heaters of lower output for vehicles, in which heater combustion air is fed into the combustion space through air supply openings via an annular space surrounding the combustion chamber, has been known from DE 33,18,054 A1. Regardless of the type of fuel preparation (evaporative burners, mechanical atomizers, ultrasonic atomizers, etc.), it is not possible to operate these devices in partial load ranges below 1:4 with still acceptable combustion properties.

SUMMARY AND OBJECTS OF THE INVENTION

The basic object of the present invention is to provide a heater of this above mentioned type, which permits operation in a partial load range of at least 1:10 to 1:15 with good burn-out and low emission, regardless of the type of fuel preparation selected.

This object is attained based on the discovery that, if the air ratios are assumed to be similar to those occurring at full load, the rates at which the combustion air is admitted into the combustion chamber are not sufficient for achieving sufficient fuel-combustion air mixture formation, and that the combustion air must be influenced in such a way as to ensure that the rate of admission of the combustion air into the combustion chamber, which rate is necessary for good mixture formation, will still be reached even at an extremely low partial load.

This object is attained according to the present invention by dividing the annular space surrounding the combustion chamber in a heater of the above mentioned type into two compartments by a partition arranged approximately at right angles to the longitudinal axis of the combustion chamber and by connecting each of the compartments to an air supply line; by the combustion chamber wall having air passage openings, and by the combustion air being supplied to at least one of the air supply lines via a control element.

It is achieved with this arrangement that in partial load operation, after the necessary reduction of the amount of combustion air by reducing the fan speed, the air supply openings, which are located in the rear (downstream), are switched off, so that the remaining amount of air is supplied only through the air supply openings located in the front in the downstream direction. This air is admitted into the combustion chamber under a higher pressure and consequently at a higher rate, so that a better fuel-combustion air ratio and thus improved combustion will be obtained. It has proved to be particularly advantageous for the compartment of the annular space, which is the second compartment in the downstream direction, to be connected to the control element via an air supply line, and for the compartment of the annular space, which the first compartment in the downstream direction, to be connected to the combustion air line leading to the control element. A particularly simple and compact design with increased ease of control is thus obtained. A back-pressure-controlled control element, which has a simple design and operates particularly reliably under the given conditions of a heater, is preferably used as the control element. A further improvement can be achieved, according to a variant, by increasing the air passage cross sections in the combustion chamber wall in the downstream direction. This can be achieved either by increasing the number of air passage openings or by providing such openings with increasing cross section at equal number of openings.

The annular space which is the first annular space in the downstream direction may also surround the combustion chamber on the inlet side at least partially in the device according to the present invention, so that part of the air supplied can also enter the combustion chamber on the front side.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

FIGS. 1 through 5 show a simplified and schematic representation of an exemplary embodiment, and the mode of operation will be described below wherein:

DETAILED DESCRIPTION OF THE PREFERRED EMBODIMENT

Figure 1:
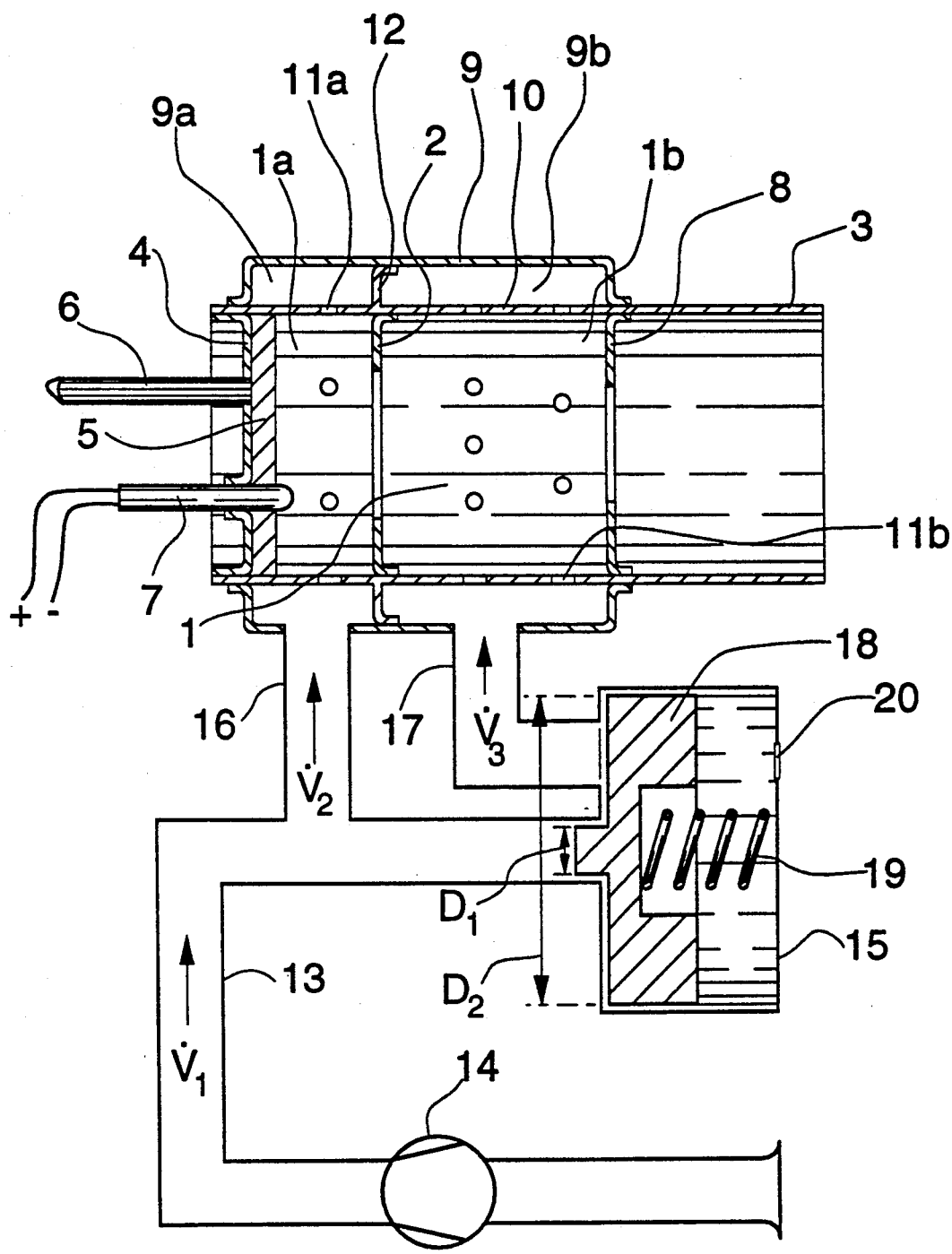
FIG. 1 is a longitudinal sectional view through a combustion chamber with the combustion air supply.

FIG. 1 shows a combustion chamber 1, which is divided by an apertured partition 2 into a combustion chamber zone 1a, which is the front zone in the downstream direction, and a combustion chamber zone 1b, which is the rear zone in the downstream direction. A flame tube 3 is connected to the combustion chamber 1. On the inlet side, the combustion chamber 1 has a combustion chamber bottom 4, on which a plate 5 made of absorbent and porous material, e.g., a nonwoven ceramic or metal wire knitted fabric, lies, via which the fuel supplied via the fuel supply line 6 is distributed for evaporation. The ignitable mixture in the combustion chamber 1 is ignited via a glow pin 7. An aperture 8, through which the flame is able to enter the flame tube 3, is arranged between the combustion chamber 1 and its the flame tube 3. In the combustion chamber wall 10, air passage openings 11a are arranged in the area of the combustion chamber zone 1a, and air passage openings 11b are arranged in the area of the combustion chamber zone 1b. The air passage cross section of the air passage openings 11a, 11b may increase in the downstream direction, either due to an increase in the number of the air passage openings 11a, 11b, or due to an increase in the cross sections, i.e., due to enlargement of the air passage openings 11a, 11a in the downstream direction. The combustion chamber 1 is surrounded by an annular space 9, which is divided by a partition 12 into a front compartment 9a, which is the front compartment in the downstream direction, and a compartment 9b, which is the rear compartment in the downstream direction.

The combustion air is supplied into the annular space 9 from the combustion air line 13 by means of a fan 14. The combustion air line 13 leads to a control element 15 and has a branch, which as an air supply line 16 is connected to the compartment 9a of the annular space 9, while the compartment 9b of the annular space 9, which is the rear compartment in the downstream direction, is connected to the control valve 15 via the air supply line 17.

The control element in this exemplary embodiment is designed as a pneumatic control valve and has a housing with a connection for the combustion air line 13 and with a connection for the air supply line 17. The housing accommodates a piston 18, which is designed as a step piston and closes and releases the connection for the combustion air line 13 with the step of smaller diameter $D_1$, and it closes and releases the connection for the air supply line 17 with the step of larger diameter $D_2$. The piston 18 acts against a spring 19; the housing also has vent openings 20.

Figure 2:
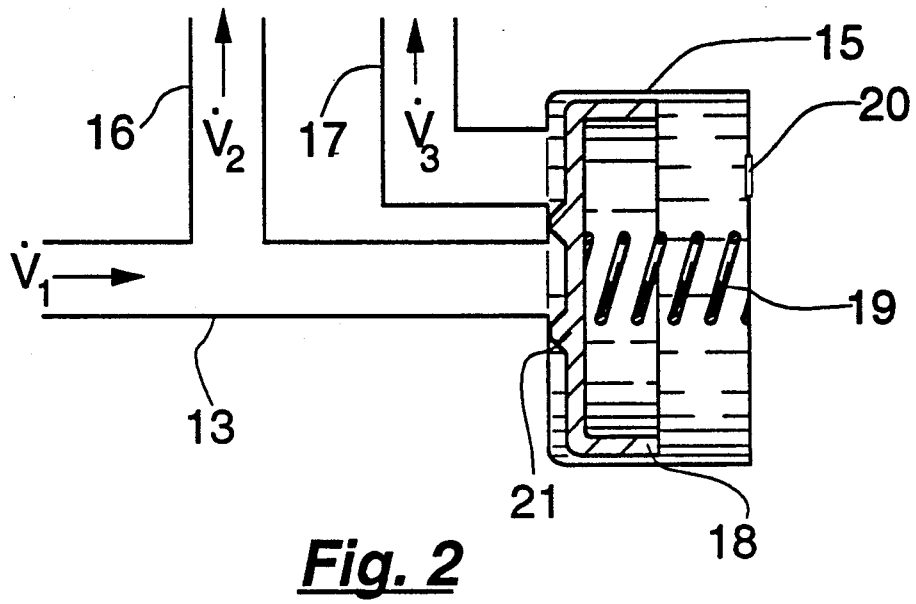
FIG. 2 is a variant of a reversing valve.

FIG. 2 shows a variant of the control element, in which the piston 18 has a pot-shaped design and is provided with a circular sealing bead 21. In this embodiment, indifferent control states, which may lead to a disturbing valve chattering, are avoided in this design due to the step piston action, especially during reversal.

Figure 3:
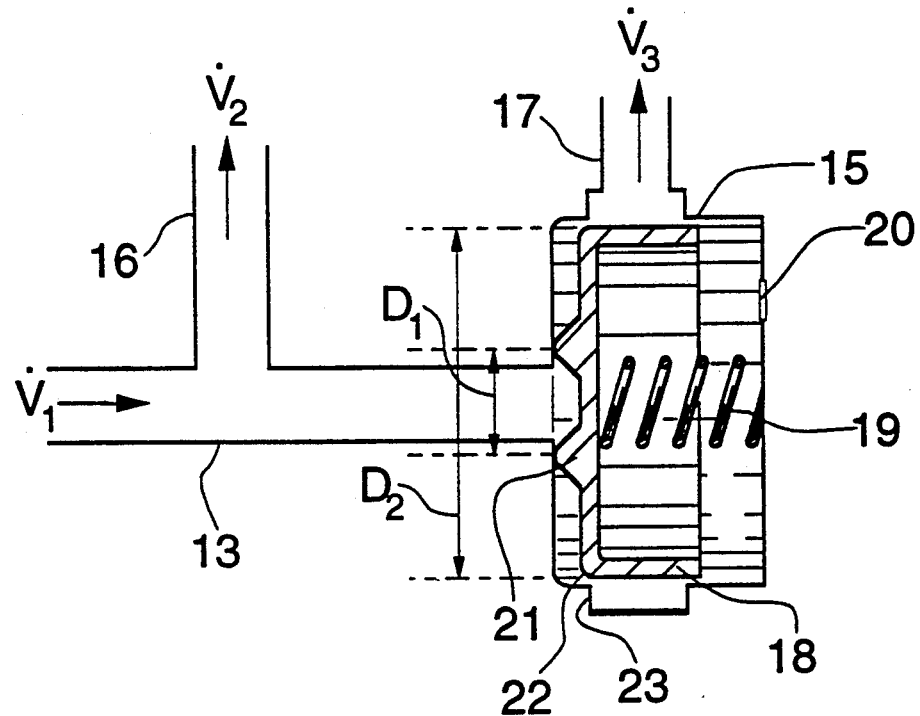
FIG. 3 is a variant according to FIG. 2 with lateral discharge of the combustion air.
Figure 5:
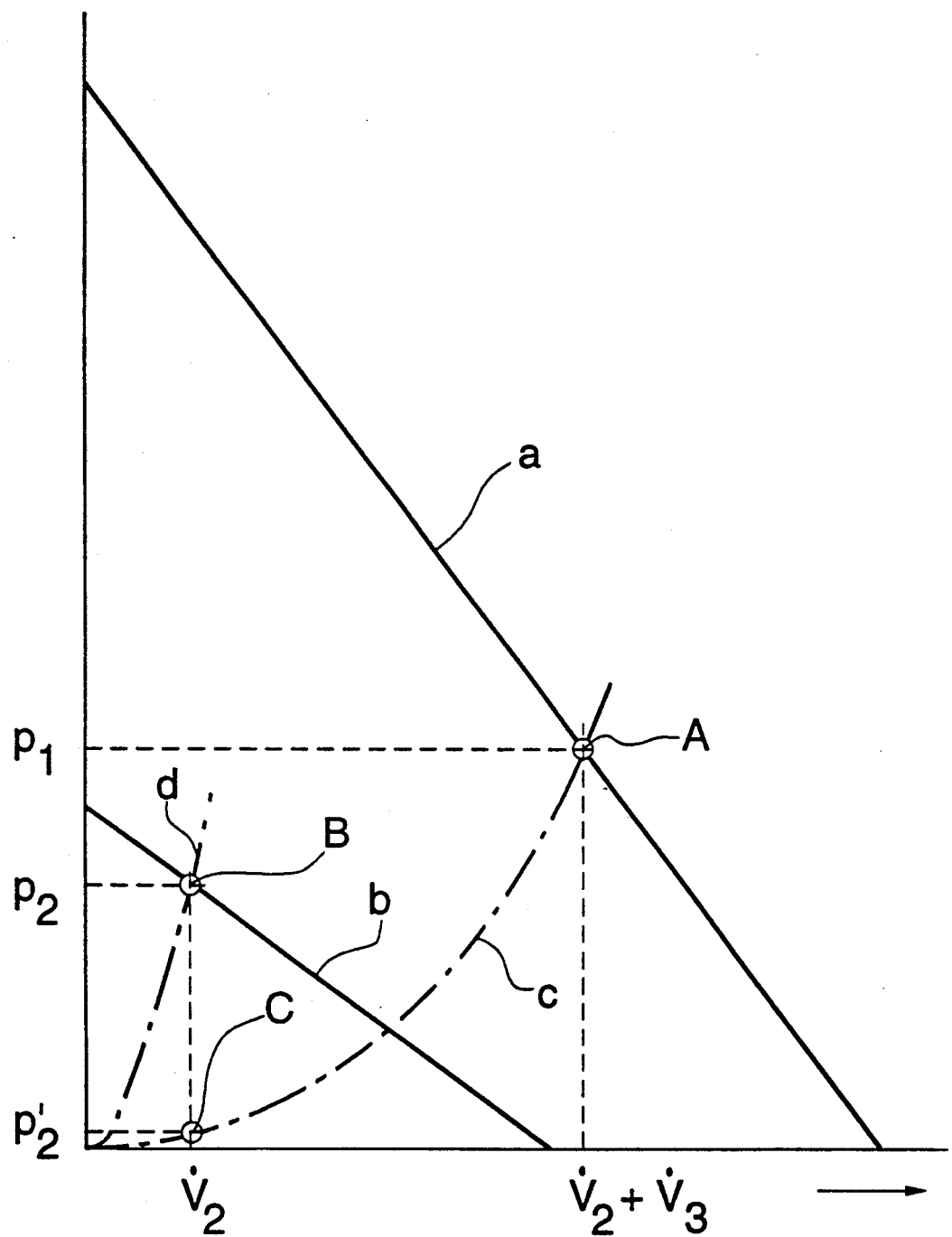
FIG. 5 is a p-v (pressure-volume) diagram with characteristics and working points.

The variant of the control element 15 according to FIG. 3 shows a lateral connection of the air supply line 17, i.e., a connection that is offset by 90° compared with the combustion air line 13. Two cooperating control edges 22, 23 are now obtained. The two control edges 22, 23 release the influx to the air supply line 17 only when the effective pressure according to the resistance characteristic d according to FIG. 5 is admitted to the larger piston surface with the diameter $D_2$, without a simultaneous release through the air passage openings 11b (shown in FIG. 1).

In one embodiment, not shown, this control element can act similarly to a pressure regulator if the diameter of the sealing bead is increased to the diameter of the piston. The two control edges define the control behavior by their shape and position, together with the force-displacement characteristic of the spring. Nearly the same pressures and consequently also the same inlet rates into the combustion chamber at full load and partial load can be preset with this embodiment.

Figure 4:
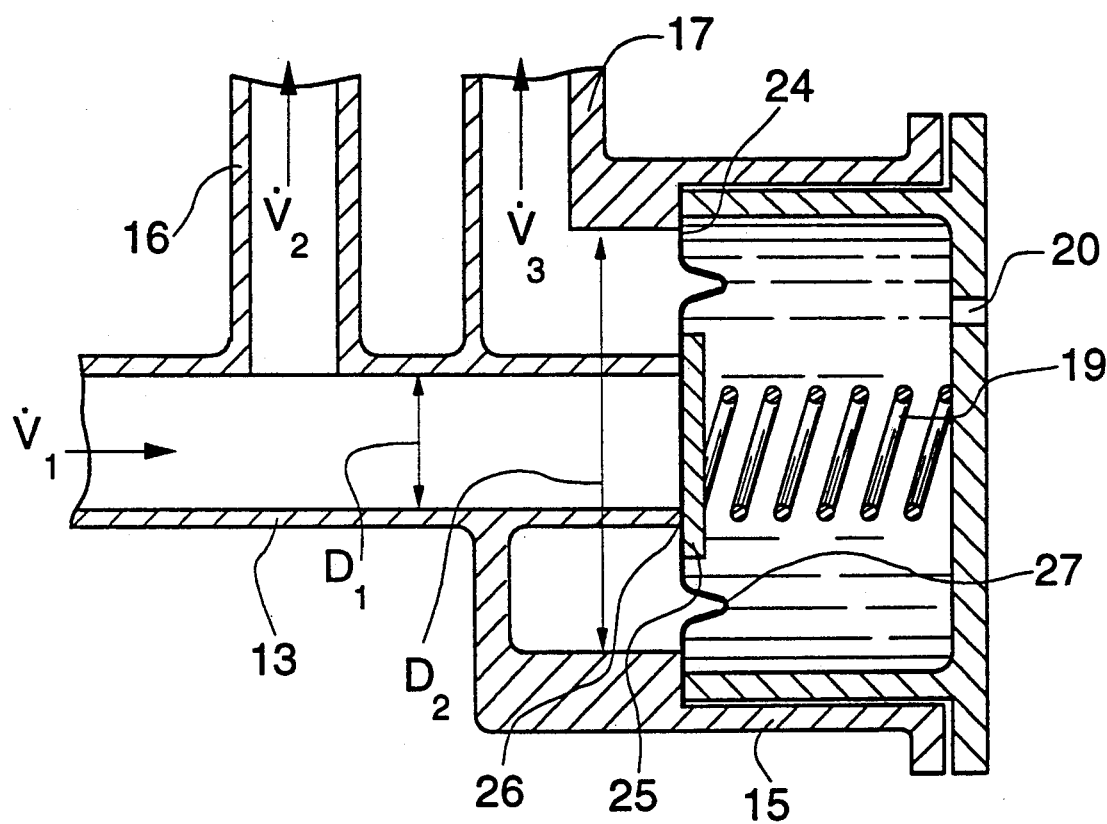
FIG. 4 is another variant of a reversing valve.

In the preferred embodiment according to FIG. 4, the piston of the pneumatic control element 15 is replaced by a diaphragm 24, e.g., one made of rubber, which is pressed by the spring 19 onto a sealing seat 26 via a spring plate 25. To improve flexibility, the diaphragm 24 has at least one welt-like bead 27. The function corresponds to that of the exemplary embodiment according to FIG. 2.

The mode of action of the arrangement according to the present invention with the preferably automatically operating the control element 15 will be described below on the basis of FIG. 1.

Mode of Operation of Reversal

1. Starting Up the Heater Under Full Load:

After the fan 14 has been started up and the amount of air needed for full load is delivered, an excess pressure, which is determined essentially by the air passage openings 11a, develops over the piston surface $D_1$. The pretension of the spring 19 is overcome, and the canal 17 is released. At the same time, the larger piston surface $D_2$ comes into action, and supports the piston's stroke movement, because the pressure acting on the piston 18 decreases due to the additional air passage openings 11b. The canal 17 thus remains wide open, and all of the air passage openings 11a, 11b are in action.

2. Reversal to Partial Load (e.g., to 1/10 the Rated Capacity):

The amount of air is reduced to, e.g., 1/5 by [reducing] the speed of the fan, and the amount of fuel is reduced to about 1/10 of the full-load value. As a result, according to $p \sim (\dot{V})^2$, the pressure will drop to very low values—to $\approx 1/25$ in the example, the load on the piston will be released, and the canal 17 will be closed. Since only the air passage openings 11a act now, the pressure will again increase to a value which is independent of the ratio of cross section 11a to cross section 11b. The design should be selected to be such that the opening pressure described under 1 will not be reached. The opening 20 is used for ventilation on the rear side of the piston. Since only the openings 11a are in action for the entry of air, higher inlet velocities with improved mixture formation will occur compared with a conventional combustion chamber without air reversal.

3. Reversal to Full Load:

The control takes place as described under 1; the air passage openings 11b are again opened.

FIG. 5 shows the function of the control element 15 with the characteristics and the working points. Here, a—shows the fan's delivery characteristic at full load,
b—shows the fan's delivery characteristic at partial load,
c—shows the resistance characteristic at full load,
d—shows the resistance characteristic at partial load,
A—shows the working point at full load,
B—shows the working point at partial load, and
C—shows the working point at partial load without a control element.

At full load (high fan speed), the working point A with the air volume $\dot{V}_2 + \dot{V}_3$ and the pressure $p_1$ becomes established at the intersection of the fan delivery characteristic a with the resistance characteristic c, which is defined primarily by the resistance of the total number of the air passage openings 11a and 11b (according to FIG. 1). After the fan speed and the amount of fuel have been reversed to the partial load operation, the partial-load working point B with the air volume $\dot{V}_2$ and the pressure $p_2$ becomes established after automatic activation of the control element 15. The position of the partial-load resistance characteristic d is now determined essentially by the cross sections of the still remaining air passage openings 11a, i.e., the air passage openings 11b are switched off at partial load.

In contrast, only the substantially lower pressure $p_2'$ and hence the working point C on the fan delivery characteristic c become established in the prior-art combustion chambers without the control element 15 and divided annular space 9. In the scale diagram, the pressure ratio is $p_2/p_2' \approx 16$, i.e., according to $w \sim \sqrt{p}$, the velocity of the air entering the combustion chamber 1 through the air passage openings 11a is increased by a factor of about 4, which leads to substantially improved mixing of the fuel and combustion air and consequently to substantially better combustion.

The solution according to the present invention does not exclusively pertain to the example shown with an evaporative burner, but it is also applicable to other, prior-art combustion systems, to atomization burners, e.g., burners with ultrasonic atomization or pressure atomization.

While a specific embodiment of the invention has been shown and described in detail to illustrate the application of the principles of the invention, it will be understood that the invention may be embodied otherwise without departing from such principles.

What is claimed is:

1. A liquid fuel-operated vehicle heater arrangement, operated independently of a vehicle engine, the heater arrangement comprising:

a combustion chamber formed with a wall with air passage openings, said combustion chamber having a downstream end connected to a flame tube for heat exchange;

fuel supply means for supplying fuel connected to said combustion chamber;

ignition means, connected to said combustion chamber, for igniting said fuel;

means defining an annular space surrounding said combustion chamber wall air passage openings including a partition extending outwardly from said wall substantially at right angles to a longitudinal axis of said combustion chamber for separating said annular space into two compartments including an upstream compartment and a downstream compartment;

a first air supply line connected to said upstream compartment and a second air supply line connected to said downstream compartment; and control element means for controlling flow of combustion air for supplying combustion air to at least one of said first air supply line and second air supply line.

2. Heater arrangement according to claim 1, wherein:

said downstream compartment annular space is connected to said control element via said second air supply line;

a combustion air supply line connected to said control means for supplying air to said second air supply line via said control means, said first air supply line being connected directly to said combustion air supply line.

3. Heater arrangement according to claim 1, wherein:
said control means includes a back-pressure controlled control valve.

4. Heater arrangement according to claim 1, wherein:
said air passage openings in said combustion chamber wall define an air passage cross section which increases in a downstream direction.

* * * * *